US008587414B2

(12) United States Patent
Bandyopadhyay et al.

(10) Patent No.: US 8,587,414 B2
(45) Date of Patent: Nov. 19, 2013

(54) WIRELESS INFORMATION AND SAFETY SYSTEM FOR MINES

(75) Inventors: Lakshmi Kanta Bandyopadhyay, Jharkhand (IN); Swades Kumar Chaulya, Jharkhand (IN); Pankaj Kumar Mishra, Jharkhand (IN)

(73) Assignee: Council of Scientific & Industrial Research, New Delhi (IN)

( * ) Notice: Subject to any disclaimer, the term of this patent is extended or adjusted under 35 U.S.C. 154(b) by 201 days.

(21) Appl. No.: 12/934,132

(22) PCT Filed: Mar. 26, 2009

(86) PCT No.: PCT/IN2009/000199
§ 371 (c)(1),
(2), (4) Date: May 10, 2011

(87) PCT Pub. No.: WO2009/118762
PCT Pub. Date: Oct. 1, 2009

(65) Prior Publication Data
US 2011/0205033 A1    Aug. 25, 2011

(30) Foreign Application Priority Data

Mar. 26, 2008 (IN) .............................. 777/DEL/2008

(51) Int. Cl.
*H04Q 5/22* (2006.01)
(52) U.S. Cl.
USPC ..... 340/10.51; 340/10.1; 340/10.2; 340/10.3; 340/10.31; 340/10.32; 340/10.33; 340/10.34; 340/10.4; 340/10.41; 340/10.42; 340/10.5; 340/10.52; 340/10.6; 235/375; 235/376; 235/377; 235/378; 235/379; 235/380; 235/381; 235/382; 235/382.5; 235/383; 235/384; 235/385

(58) Field of Classification Search
CPC ....................................................... A42B 3/046
USPC .......................... 340/10.1–10.6, 572.1–572.9; 235/375–385
See application file for complete search history.

(56) References Cited

U.S. PATENT DOCUMENTS 3,645,259 A * 2/1972 Schulman ...................... 128/869
3,668,526 A * 6/1972 Raskin ............................. 455/18

(Continued)

*Primary Examiner* — George Bugg
*Assistant Examiner* — Paul Obiniyi
(74) *Attorney, Agent, or Firm* — White & Case LLP (57) ABSTRACT

The wireless information and safety system for mines of the present invention enables continuously tracking and monitoring underground miners and moveable equipment in underground mines using ZigBee-enabled active RFID devices forming a wireless network among them and other static and mobile ZigBee devices placed at strategic locations. The present invention provides a wireless information and safety system for mines comprises in combination of ZigBee-compliant devices (programmable to operate as end devices, routers and coordinators by hardware specific embedded software) and wireless sensor network (WSN) software having various application modules both for underground and opencast mines. Use of the system of the present invention would help in identifying the miners entering in underground mine to keep the track of the miners and maintain computerized attendance. This would help in monitoring equipment locations and their operation to improve productivity and reduce fatal collision accident. This would help in locating and tracking the miners in case of disaster for speedy rescue operation. This would help in monitoring miners' unsafe practice and providing warning to the respective miner. This would further help in real time monitoring environmental parameters in underground mine. This would also help in sending coded message to the concerned person in underground mine. This would further help in monitoring movement of dumpers in opencast mine, which will ultimately help in optimum shovel-dumper performance and improving productivity.

6 Claims, 9 Drawing Sheets

(56) References Cited

U.S. PATENT DOCUMENTS

| | | | |
|---|---|---|---|
| 3,936,822 A * | 2/1976 | Hirschberg | 340/522 |
| 4,477,041 A * | 10/1984 | Dunne | 244/122 AG |
| 4,656,463 A * | 4/1987 | Anders et al. | 340/573.4 |
| 4,688,037 A * | 8/1987 | Krieg | 340/4.11 |
| 4,722,574 A * | 2/1988 | Barham et al. | 299/1.05 |
| 4,827,395 A * | 5/1989 | Anders et al. | 700/9 |
| 4,837,853 A * | 6/1989 | Heck | 455/208 |
| 4,903,346 A * | 2/1990 | Reddemann et al. | 2/411 |
| 5,039,035 A * | 8/1991 | Fitzpatrick | 244/122 AG |
| 5,200,736 A * | 4/1993 | Coombs et al. | 340/586 |
| 5,208,514 A * | 5/1993 | Bassick | 318/560 |
| 5,272,770 A * | 12/1993 | Allen et al. | 2/421 |
| 5,322,245 B * | 6/1994 | Bassick | 244/122 B |
| 5,329,637 A * | 7/1994 | Walker | 2/5 |
| 5,539,935 A * | 7/1996 | Rush, III | 2/422 |
| 5,584,062 A * | 12/1996 | Meador et al. | 455/260 |
| 5,621,922 A * | 4/1997 | Rush, III | 2/422 |
| 5,978,972 A * | 11/1999 | Stewart et al. | 2/422 |
| 6,512,312 B1 * | 1/2003 | Herkenrath et al. | 307/326 |
| 6,826,509 B2 * | 11/2004 | Crisco, III et al. | 702/141 |
| 7,091,875 B2 * | 8/2006 | Ondracek | 340/4.11 |
| 7,184,618 B2 * | 2/2007 | Kenagy et al. | 385/17 |
| 7,519,405 B1 * | 4/2009 | Brent | 455/575.9 |
| 7,563,001 B2 * | 7/2009 | Bobbin et al. | 362/253 |
| 7,689,295 B2 * | 3/2010 | Strole | 700/25 |
| 7,747,559 B2 * | 6/2010 | Leitner et al. | 707/770 |
| 7,796,029 B2 * | 9/2010 | Ma et al. | 340/539.25 |
| 7,843,336 B2 * | 11/2010 | Kucharyson | 340/540 |
| 7,930,771 B2 * | 4/2011 | Depreitere et al. | 2/411 |
| 7,941,873 B2 * | 5/2011 | Nagely et al. | 2/425 |
| 7,992,421 B2 * | 8/2011 | Jeftic-Stojanovski et al. | 73/12.04 |
| 8,138,911 B2 * | 3/2012 | Collins et al. | 340/539.1 |
| 8,159,214 B2 * | 4/2012 | Uchiyama et al. | 324/207.22 |
| 8,181,281 B2 * | 5/2012 | Nagely et al. | 2/425 |
| 8,232,881 B2 * | 7/2012 | Hertz | 340/573.1 |
| 8,294,568 B2 * | 10/2012 | Barrett | 340/539.11 |
| 2002/0070881 A1 * | 6/2002 | Marcarelli et al. | 340/988 |
| 2002/0160723 A1 * | 10/2002 | Yagi | 455/90 |
| 2003/0137421 A1 * | 7/2003 | Herkenrath et al. | 340/573.1 |
| 2003/0197608 A1 * | 10/2003 | Rudhard et al. | 340/539.18 |
| 2005/0086579 A1 * | 4/2005 | Leitner et al. | 715/500 |
| 2005/0162265 A1 * | 7/2005 | Werner et al. | 340/468 |
| 2006/0038694 A1 * | 2/2006 | Naunheim et al. | 340/665 |
| 2006/0062376 A1 * | 3/2006 | Pickford | 379/265.12 |
| 2006/0071781 A1 * | 4/2006 | Ondracek | 340/539.12 |
| 2006/0074338 A1 * | 4/2006 | Greenwald et al. | 600/549 |
| 2007/0061041 A1 * | 3/2007 | Zweig | 700/245 |
| 2007/0089480 A1 * | 4/2007 | Beck | 73/12.01 |
| 2007/0264967 A1 * | 11/2007 | Collins et al. | 455/404.2 |
| 2008/0030977 A1 * | 2/2008 | Bobbin et al. | 362/106 |
| 2008/0066217 A1 * | 3/2008 | Depreitere et al. | 2/412 |
| 2008/0074254 A1 * | 3/2008 | Townsend et al. | 340/539.11 |
| 2008/0084294 A1 * | 4/2008 | Zhiying et al. | 340/539.22 |
| 2008/0238651 A1 * | 10/2008 | Kucharyson | 340/506 |
| 2008/0256687 A1 * | 10/2008 | Spencer | 2/425 |
| 2009/0038056 A1 * | 2/2009 | Bobbin et al. | 2/422 |
| 2009/0045285 A1 * | 2/2009 | Mastrolia | 244/122 AG |
| 2009/0058600 A1 * | 3/2009 | Krepel et al. | 340/10.1 |
| 2009/0180279 A1 * | 7/2009 | Bobbin et al. | 362/106 |
| 2010/0005571 A1 * | 1/2010 | Moss et al. | 2/410 |
| 2010/0102970 A1 * | 4/2010 | Hertz | 340/573.1 |
| 2010/0155535 A1 * | 6/2010 | Mastrolia | 244/122 AG |
| 2010/0170022 A1 * | 7/2010 | Griffiths | 2/6.1 |
| 2010/0298683 A1 * | 11/2010 | Cabrera et al. | 600/364 |
| 2010/0307223 A1 * | 12/2010 | Jeftic-Stojanovski et al. | 73/12.04 |
| 2010/0308993 A1 * | 12/2010 | Ma et al. | 340/539.25 |
| 2011/0084167 A1 * | 4/2011 | Mastrolia | 244/122 AG |
| 2011/0150206 A1 * | 6/2011 | Pickford | 379/265.09 |
| 2011/0184663 A1 * | 7/2011 | Mack et al. | 702/41 |
| 2011/0185481 A1 * | 8/2011 | Nagely et al. | 2/422 |
| 2011/0204891 A1 * | 8/2011 | Drake et al. | 324/309 |
| 2011/0215931 A1 * | 9/2011 | Callsen et al. | 340/573.1 |
| 2011/0218756 A1 * | 9/2011 | Callsen et al. | 702/139 |
| 2011/0218757 A1 * | 9/2011 | Callsen et al. | 702/141 |
| 2011/0219852 A1 * | 9/2011 | Kasten | 73/12.04 |
| 2011/0227700 A1 * | 9/2011 | Hamerly et al. | 340/10.1 |
| 2011/0234374 A1 * | 9/2011 | Insley et al. | 340/10.1 |
| 2012/0036620 A1 * | 2/2012 | Harris | 2/414 |
| 2012/0062366 A1 * | 3/2012 | Pappu et al. | 340/10.1 |
| 2012/0075072 A1 * | 3/2012 | Pappu | 340/10.1 |
| 2012/0092178 A1 * | 4/2012 | Callsen et al. | 340/669 |
| 2012/0147009 A1 * | 6/2012 | Benzel et al. | 345/440 |
| 2012/0222197 A1 * | 9/2012 | Nagely et al. | 2/410 |

\* cited by examiner

WIRELESS INFORMATION AND SAFETY SYSTEM FOR MINES

The present invention relates to a wireless information and safety system for mines. The present invention particularly relates to a wireless information and safety system for mines which is capable of continuous tracking and monitoring of underground miners' and equipment movement in real-time. The present invention more particularly relates to a wireless information and safety system for mines, which enables continuous monitoring of miners and equipment location, environmental parameters, miners entering in the unsafe area, provides warning signal and coded message to the respective miner, and also prevents vehicle collisions in mines.

The wireless information and safety system for mines of the present invention is a combination of hardware and software, wherein Radio Frequency Identification (RFID) devices have been provided with a resident hardware specific embedded software for programming the RFID devices to function as coordinator, router and end devices; and an application software, wireless sensor network (WSN), for tracking, monitoring and storing of information received from RFID devices placed at strategic locations of a mine. ZigBee-enabled active RFID devices have been used to form a wireless network for the wireless information and safety system for mines of the present invention.

RFID system is a widely used Auto-ID technology today to identify and track objects and people in manufacturing, inventory management, retailing, and security applications. ZigBee is a low-cost, low-power and wireless mesh networking standard. The low cost allows the technology to be widely deployed in wireless control and monitoring applications, the low power-usage allows longer life with smaller batteries, and the mesh networking provides high reliability and larger range.

The ZigBee technology, which is a recently emerged network communication protocol based on the IEEE 802.15.4 standard, provides a self-organized mesh network topology with a power-effective, low data rate and multi hop data transmission. The RFID system could profit some of its features by introducing the ZigBee technology into the existing RFID architectures, such as having extended effective range, improving network flexibility and having compatibility with other ZigBee enabled environment systems.

The wireless information and safety system for mines of the present invention is particularly useful for underground and opencast mines. Use of the system of the present invention in underground mine would help in on-line tracking and monitoring miners and moveable equipment using ZigBee-enabled active RFID devices forming a wireless network among themselves and other static and mobile ZigBee devices placed at strategic locations. This would help in identifying the miners entering in underground mine to keep the track of the miners and maintain computerized attendance. This would help in monitoring equipment locations and their operation to improve productivity and reduce fatal collision accident. This would help in locating and tracking the miners in case of disaster for speedy rescue operation. This would help in monitoring miners' unsafe practice and providing warning to the respective miner. This would further help in real time monitoring environmental parameters in underground mine. This would also help in sending coded message to the concerned person in underground mine. This would help in establishing communication from the surface to underground in case of disaster in some portion of an underground mine by forming alternative wireless network with the available nearby ZigBee transceivers (routers). This would further help in monitoring movement of dumpers in opencast mine, which will ultimately help in optimum shovel-dumper performance and improving productivity.

The hitherto known prior art generally related to wireless sensor networking is referred to herein below.

Reference may be made to the Proceeding (572) Communication Systems, Networks, and Applications—2007, titled: ZigBee Enabled Radio Frequency Identification System.

http://www.actapress.com/
PaperInfo.aspx?PaperID=31796&reason=500

In this paper, a discussion is made about the possible benefits and applications while applying ZigBee to the different parts of the RFID system. An integrated ZigBee RFID system architecture is also discussed and a demo system is described in the paper.

Reference may be made to patent number: WO2007065987, entitled "Method for rebuilding an ad hoc network and the nodes thereof", wherein a system has been described and claimed for rebuilding an ad hoc network for collecting data of the network nodes in terms of quality of connections and non-optimal network trees, and for calculating a current optimised structure.

Reference may be made to patent number: US2007132579, entitled "Electric device with wireless communication module", wherein a system has been described and claimed for receiving weather information through a pager network. The device calculates well-being indexes from the weather information, and provides the well-being indexes to the user by itself and through the other electric devices in a real time.

Reference may be made to patent number: CA2559125, entitled "Locating and identifying a person using a mobile device", wherein a system has been described and claimed for communicating wirelessly with a smart card reader to obtain identification of a person whose smart card is coupled to the smart card reader. The mobile device transmits the identification to a server via a network. The mobile device also transmits information about its location to the server. The server determines the identity and location of the person that is using the mobile device.

Reference may be made to patent number: KR100668228B, entitled "Wireless communication system of using ZigBee technology", wherein a system has been described and claimed for wireless communication system using ZigBee technology for surface application.

Reference may be made to patent number: JP2007067533, entitled "Inter-vehicle communication system", wherein a system has been described and claimed for inter-vehicle communication. A wireless communication terminal installed on a vehicle running on a road can transmit information items of a surrounding environment of the vehicle or abnormality information items on the occurrence of abnormality caused in the vehicle, or various information items provided from a base station in real time to another vehicle via the base station or directly.

Reference may be made to patent number: CN1920502, entitled "Remote wireless temperature measuring system", wherein a system has been described and claimed for wireless measurement of temperature from remote place. The system comprises of at least one node system, ZigBee data receiver, wireless data transmitter and manage server. The node system is formed by using temperature detector via data line to connect the ZigBee temperature collector, The ZigBee data receiver via RS232 data line is connected to the wireless data transmitter.

Reference may be made to patent number: TW257462B, entitled "Detection and transmission system for fuel gas monitoring", wherein a system has been described and claimed for fuel gas monitoring, wherein a control unit built in each fuel gas meter carries out emergency handling for situation of abnormal operation, and immediately transmits related information (which contains readings of the meter, title of the meter, status of the meter and so forth) to a central monitor module through short-distance transmission units adopting ZigBee short-distance wireless communication standard and communicating each other for data collection and management and to take necessary actions for emergency handling.

Reference may be made to patent number: WO2007021269, entitled "Method, apparatus and system for multicast communication in a wireless multi-hop network", wherein a system has been described and claimed for a method for multicast communication in a network having plural nodes according to the ZigBee network specification includes creating a multicast group including a subset of the plural nodes and excluding at least one non-member node in the plural nodes. The multicast group has a multicast address. The method also includes transmitting multicast message including the multicast address and receiving the multicast message at each node in the multicast group.

Reference may be made to U.S. Pat. No. 7,233,247, entitled "Method and system for employing RFID tags in automated applications", wherein a system has been described and claimed for providing communication using Radio Frequency Identification (RFID) tags. An RFID base unit is provided to communicate with at least two different types of RFID tags that are commercially available. Additionally, the RFID base unit can communicate with any number of devices, including but not limited to computer networks, which allow for dynamic access and updates to tailor the RFID base unit for virtually any situation.

Reference may be made to U.S. Pat. No. 7,015,817, entitled "Personal tracking device", wherein a system has been described and claimed for monitoring the location of individuals, such as parolees, includes a wearable device worn by the individual and a portable device operatively coupled to the wearable device. The portable device is operatively coupled to a monitoring system through a wireless telephone network. The portable device transmits periodically encrypted location information as well as status information across the wireless network to the monitoring system. The monitoring system tracks the location of the individual and alerts the appropriate authorities when the individual violates a rule, such as a condition for parole.

Reference may be made to U.S. Pat. No. 7,148,803, entitled "Radio frequency identification (RFID) based sensor networks", wherein a system has been described and claimed for an RF addressable sensor network includes one or more RF addressable sensors, one or more wireless sensor readers coupled to a communications network, and one or more end user devices coupled to the communications network.

Reference may be made to U.S. Pat. No. 7,079,832, entitled "Electronic device cover with embedded radio frequency (RF) reader and method of using same", wherein a system has been described and claimed for a changeable cover for an electronic device and method of using same. The cover has a reader for interrogating transponder tags. The cover provides information from the tag in response to the interrogation signal to the electronic device.

Reference may be made to U.S. Pat. No. 7,002,461, entitled "Passive RFID transponder/machine-mounted antenna and reader system and method for hidden obstacle detection and avoidance" and U.S. Pat. No. 6,621,417, entitled "Passive RFID transponder/reader system and method for hidden obstacle detection and avoidance", wherein a system has been described and claimed for detecting and identifying fixed utility objects, such as telephone pedestals, power transformers, man-holes, anchor cables, and the like, that are hidden by heavy overgrowth of vegetation. The system provides for automatic look-ahead detection of such objects during mowing and clearing operations with heavy machinery using passive radio frequency transponder technology to both detect the immediate presence of a tagged object as well as basic identification of the type of object replying to the interrogation.

Reference may be made to U.S. Pat. No. 7,161,926, entitled "Low-latency multi-hop ad hoc wireless network", wherein a system has been described and claimed for wireless communication on the surface using multi-hop ad hoc network. A multi-radio sensor node is provided in the system that includes two or more communication devices. The communication devices include radio frequency (RF) devices like radios. Each communication device supports simultaneous communications among multi-radio sensor nodes of respective independent network clusters.

Reference may be made to U.S. Pat. No. 6,662,099, entitled "Wireless roadway monitoring system", wherein a system has been described and claimed for wireless communication system for roadway. A wireless, in-road traffic sensor system using sensors is small, low-cost, and rugged. The sensors may be capable of measuring the speed of passing vehicles, identifying the type of passing vehicle and measuring information about roadway conditions, e.g., wet or icy. The sensor includes a wireless transmitter and may be configured for installation beneath a roadway surface. The sensors may be configured as a traffic sensor system including distributed sensors across a roadway system, concentrators for receiving the sensor broadcasts and a central computer for accumulating and organizing the sensed information. The sensed information may also be made available responsive to user requests via the Web through such reports as traffic delays, alternate route planning and travel time estimates. Alternatively, the sensed information may also be used to control traffic through a traffic control means, such as a traffic signal.

Reference may be made to U.S. Pat. No. 6,990,080, entitled "Distributed topology control for wireless multi-hop sensor networks", wherein a system has been described and claimed for a distributed wireless multi-hop network. The network includes multiple potentially mobile nodes. Each node sends a discovery message in all directions. Each node discovers a set of neighboring nodes using a set of incoming signals from the neighboring nodes that are responsive to the discovery message.

Reference may be made to U.S. Pat. No. 7,252,230, entitled "Method and apparatus for real-time tracking of inventory using active RFID technology", wherein a system has been described and claimed for dynamically tracking assets located in different geographic zones. The system includes a central zone hosting an inventory system. The inventory system is in network communication with remote zones that include sensors for interrogating tagged assets located in the zones.

Reference may be made to patent number: US2007176755, entitled "Method for wireless data transmission and a transponder", wherein a system has been described and claimed for wirelessly transmission of data between a base station and a transponder. Data are wirelessly and bi-directionally transmitted between the base station and the transponder.

Reference may be made to patent number: US2007176747, entitled "Reader for RFID and RFID system", wherein a system has been described and claimed for wireless communication using RFID devices. A reader for RFID that receives a channel signal comprises a frequency oscillator generating an oscillating signal at a frequency that is offset by an offset frequency from a center frequency of the channel signal, a mixer mixing the channel signal with the oscillating signal that is offset, and a filter filtering a mixed frequency signal provided from the mixer.

Reference may be made to patent number: US2007176772, entitled "RFID tag, RFID reader/writer, RFID system, and processing method of RFID system", wherein a system has been described and claimed for wireless communication using RFID tags. When measurements are performed several times by using RFID tags each incorporating a sensor unit, generation of a carrier directed from an RFID reader/writer to the RFID tags is stopped for a predetermined period every time when a measurement ends.

Reference may be made to patent number: US2007176782, entitled "Device location system and method", wherein a system has been described and claimed for locating hidden objects. The system consists of a position beacon (associated with a specified physical location) and a detection beacon (attached to or physically associated with the device).

Reference may be made to patent number: US2007177738, entitled "Secure two-way RFID communications", wherein a system has been described and claimed for providing secure two-way (reader-to-tag and tag-to-reader) RFID communications. A RFID tag receives a noise-encrypted RF carrier signal from a reader and backscatter modulates it with tag information.

The drawbacks of the above said patent numbers: WO2007065987, US2007132579, CA2559125, KR100668228B, JP2007067533, CN1920502, TW257462B, WO2007021269, U.S. Pat. Nos. 7,233,247, 7,015,817, 7,148,803, 7,079,832, 7,002,461, 7,161,926, 6,662,099, 6,990,080, 7,252,230, US2007176755, US2007176747, US2007176772, US2007176782 and US2007177738 are that the systems are especially designed for surface application only. The systems are not intrinsically safe for using in underground mine. The systems consume more power and the same are not suitable for installing in underground mine. Moreover, the systems have no provision for different essential applications in underground mine, like vehicle collision prevention, gas monitoring, messaging and providing warning signal to the miner's approaching unsafe area.

Reference may be made to patent number: CN1953408, entitled "A method to realize real-time monitoring of the underground coal miners by ZigBee network", wherein a system has been described and claimed for real-time monitoring of underground miners using a ZigBee network.

Reference may be made to patent number: KR100612700B, entitled "System and method for providing underground facility information using RFID", wherein a system has been described and claimed for providing information facility for underground using RFID tags.

Reference may be made to patent number: CN2871852Y, entitled "Mine comprehensive information system under well based on ZigBee technology wireless network", wherein a system has been described and claimed for wireless communication in mine. The system is proposed for monitoring miner's location.

The drawbacks of the above said patent numbers: CN1953408, KR100612700B and CN2871852Y are that the systems have no provision for different essential application for underground mine, like vehicle collision prevention, gas monitoring, messaging and providing warning signal to the miner's approaching unsafe area.

From the above referred hitherto known prior art systems and drawbacks thereof, it is clear that there is a definite need to provide a low-powered intrinsically safe wireless information and safety system for locating underground miners and equipment, wireless environmental monitoring and collision prevention.

The main objective of the present invention is to provide a wireless information and safety system for mines, which obviates the drawbacks of the hitherto known prior art as detailed herein above.

Another objective of the present invention is to track and monitor miners and equipment in underground mine using ZigBee-enabled active RFID devices forming a wireless network among themselves and other static and mobile ZigBee devices placed at strategic locations, which obviates the drawbacks of the hitherto known prior art as detailed above.

Still another objective of the present invention is to identify the miners entering in underground mine to keep the track of the miners and maintain computerized attendance.

Yet another objective of the present invention is to monitor equipment locations and their operation to improve productivity and reduce fatal collision accident.

Still yet another objective of the present invention is to locate and track the miners in case of disaster for speedy rescue operation.

A further objective of the present invention is to monitor miners' unsafe practice and providing warning to the respective miner.

A still further objective of the present invention is to monitor environmental parameters in underground mine in real-time.

A yet further objective of the present invention is to send coded message to the concerned person in underground mine.

Another objective of the present invention is to automatically form alternative network among the undisturbed and reachable routers in case of disaster in particular area in underground mine so that communication does not get disturb in the whole mine.

Still another objective of the present invention is to monitor movement of dumpers in opencast mine, which ultimately helps in optimum shovel-dumper performance and improving productivity.

Yet another objective of the present invention is to develop a low-powered, intrinsically safe, easy to install and cost-effective wireless information and safety system for underground and surface mines.

The wireless information and safety system for mines of the present invention tracks and monitors miners and equipment, measures environmental parameters and sends alert message in mines. The wireless information and safety system for mines of the present invention is a combination of hardware and software, wherein ZigBee-enabled active RFID transceiver devices have been used to form a wireless network. The RFID devices have been provided with resident hardware specific embedded software for programming the RFID transceiver devices to function as coordinator, router and end device. The software is compiled and debugged in the IAR Embedded Workbench and TI-make Library using 'C' language. IAR Systems is a Swedish computer technology company working in the area of embedded system development tools; whereas TI (Texas Instruments) is an American company in the area of electronic devices and chips.

The system of the present invention essentially consists of two modules, hardware devices and wireless sensor network embedded application specific software.

The hardware module is ZigBee-compliant active RFID transceiver devices provided with resident application specific embedded software to act as end device (tag), router or coordinator. The devices programmed to act as end device, router or coordinator enables them to form an IEEE 802.15.4-based mesh network. It uses a unified wireless mesh-networking infrastructure to locate, trace and manage mobile assets and people as well as monitor different environmental conditions using sensors. The ZigBee devices have numerous features, namely, unlicensed 2.4 GHz industrial, scientific and medical (ISM) band, ultra low power (ideal for battery operated system), operates for years on inexpensive batteries, large number of nodes/sensors, reliable and secure links between network nodes, easy deployment and configuration, low cost system, very fast transition time, digital battery monitor facility, smaller in size (system on chip), and capable of automatically forming alternative network among the undisturbed and reachable routers in case of disaster.

The resident application software module is a wireless sensor network (WSN) software which is developed for tracking, monitoring and storing of information received from RFID devices placed at strategic location of a mine. The software is specially designed for different purposes in mines and has following modules: (i) Tracking of miners and vehicles, (ii) Route tracking in opencast mines, (iii) Preventing fatal accidents, (iv) Preventing vehicle collisions, (v) Environmental monitoring, (vi) Monitoring miner's unsafe practice, (vii) Sending alert message, and (viii) Preparing computerised miners' duty hours.

In the FIGS. 1 to 6 of the drawings accompanying this specification is described the wireless information and safety system for mines.

FIG. 3 of the drawings shows the flow diagram of the application software. The wireless sensor network (WSN) software tracks, monitors and stores information received from RFID transceiver devices located in different portions of a mine.

The system of the present invention is a combination of hardware and software modules, wherein hardware devices consisting of ZigBee-compliant active RFID transceiver devices are provided with resident hardware specific embedded software for programming the RFID devices to function as coordinator, router and end devices; and an application software, wireless sensor network (WSN), for tracking, monitoring and storing of information received from RFID devices placed at strategic locations of a mine.

Figure 1:
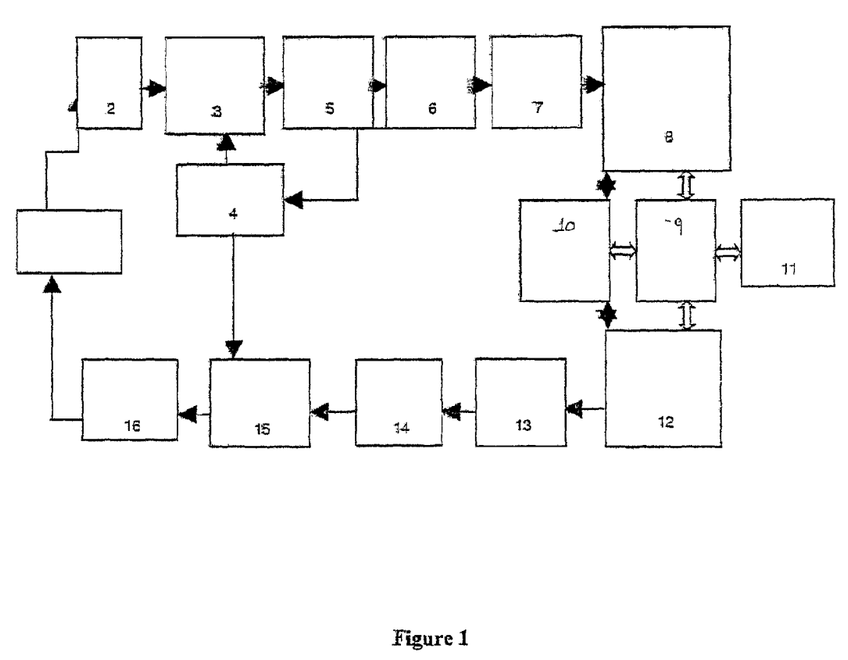
FIG. 1 of the drawings shows the block diagram of ZigBee transceiver which are programmed to work as end device, router and coordinator and to form wireless sensor network in the mine. The ZigBee transceiver consists of sub-systems (1) to (16) for receiving and transmitting 2.4 GHz RF signal through the wireless sensor network in the mine.
Figure 2A:
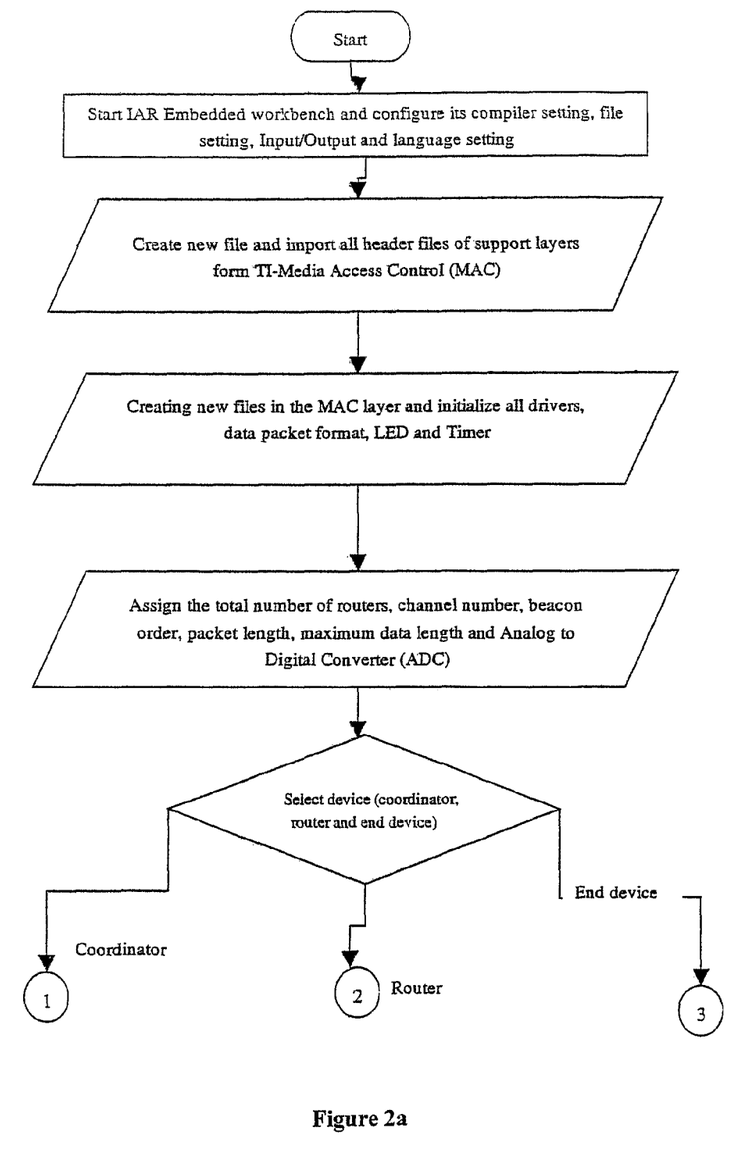
FIGS. 2a to 2d of the drawings shows the flow diagram of the hardware specific embedded software. The RFID devices have been provided with resident hardware specific embedded software for programming the RFID devices to function as coordinator, router and end device.
Figure 2B:
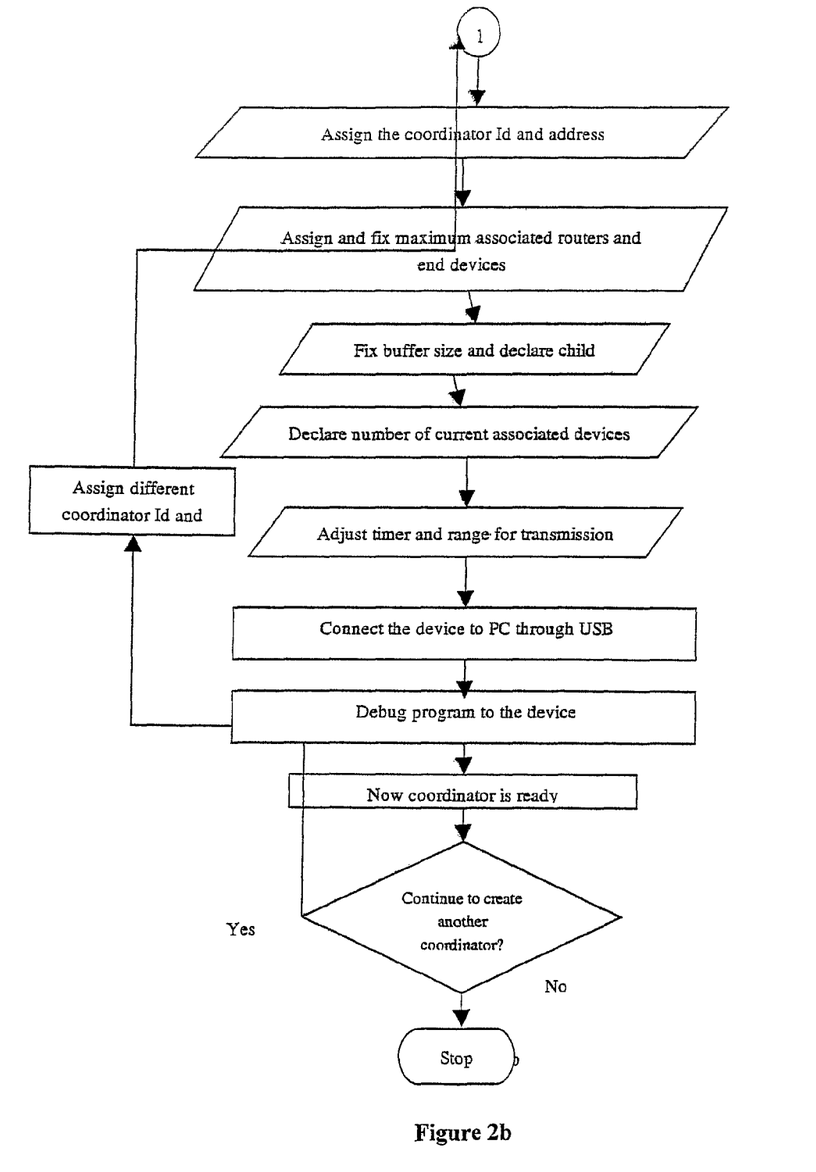
Figure 2C:
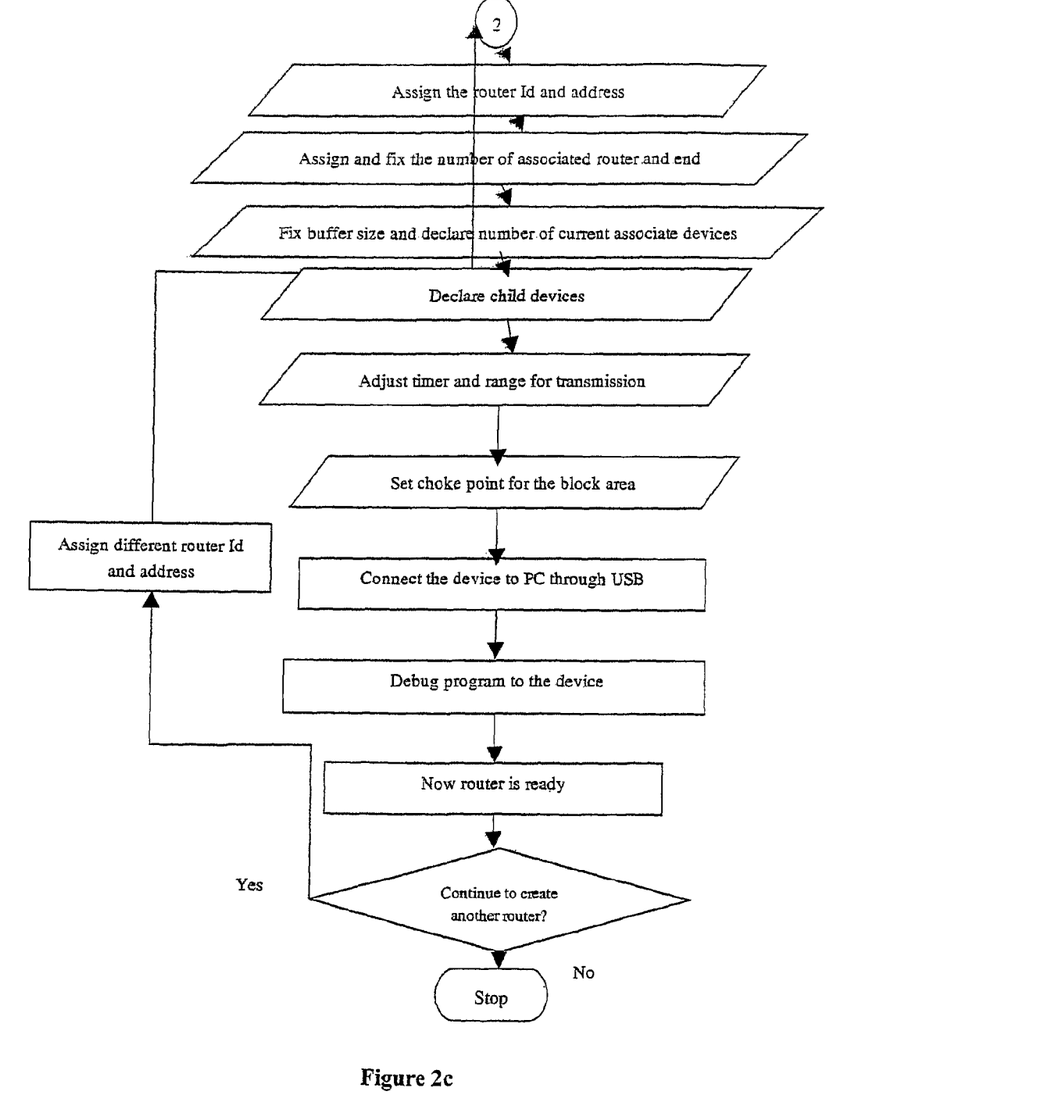
Figure 2D:
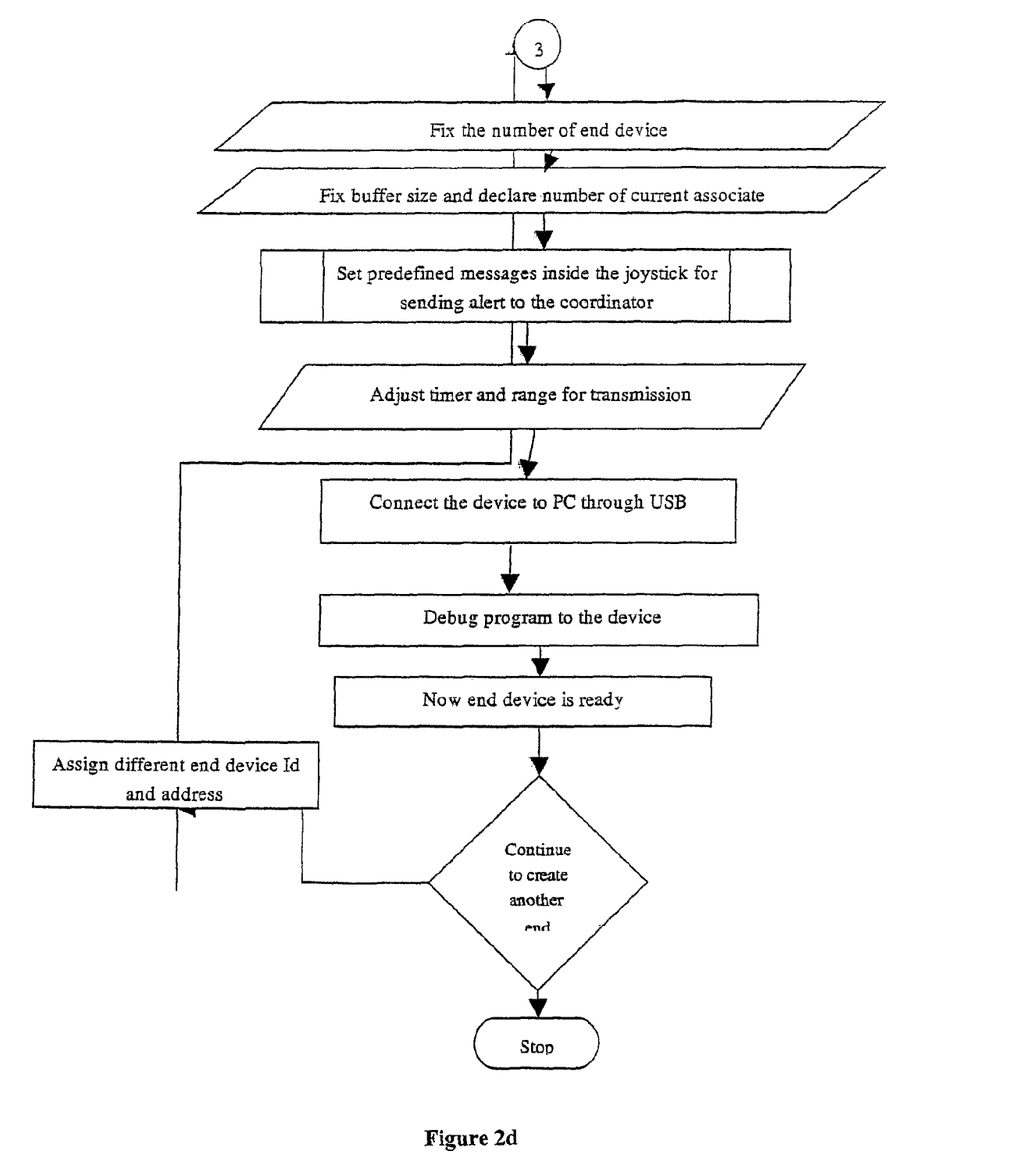

The details of the FIGS. 1 to 6 of the drawings are given below:

The block diagram of ZigBee transceiver of the wireless information and safety system for mines of the present invention is depicted in FIG. 1, which consists of antenna (1), low noise filter (2), down-conversion mixer (3), local oscillator (4), band pass filter (5), amplifier (6), analog to digital converter (7), digital demodulator (8), radio data interface (9), control logic (10), microcontroller unit (11), digital modulator (12), analog converter (13), low pass filter (14), up convertion mixer (15) and power amplifier (16). The antenna (1) is connected in series to low noise filter (2), down-conversion mixer (3), band pass filter (5), amplifier (6), analog to digital converter (7) and digital demodulator (8). Local oscillator (4) is connected to the said down-conversion mixer (3) and amplifier (6). The said digital demodulator (8) is connected to digital modulator (12) through radio data interface (9). Control logic (10) is connected to the said digital demodulator (8), digital modulator (12) and the said radio data interface (9). Microcontroller unit (11) is connected to the said data interface (9). The said digital modulator (12) is serially connected to analog converter (13), low pass filter (14), up-conversion mixer (15) and power amplifier (16). The said local oscillator (4) is connected with the said up-conversion mixer (15).

FIGS. 2a to 2d of the drawings shows the flow diagram of the hardware specific embedded software, in coordinator, router and end device.

Figure 3:
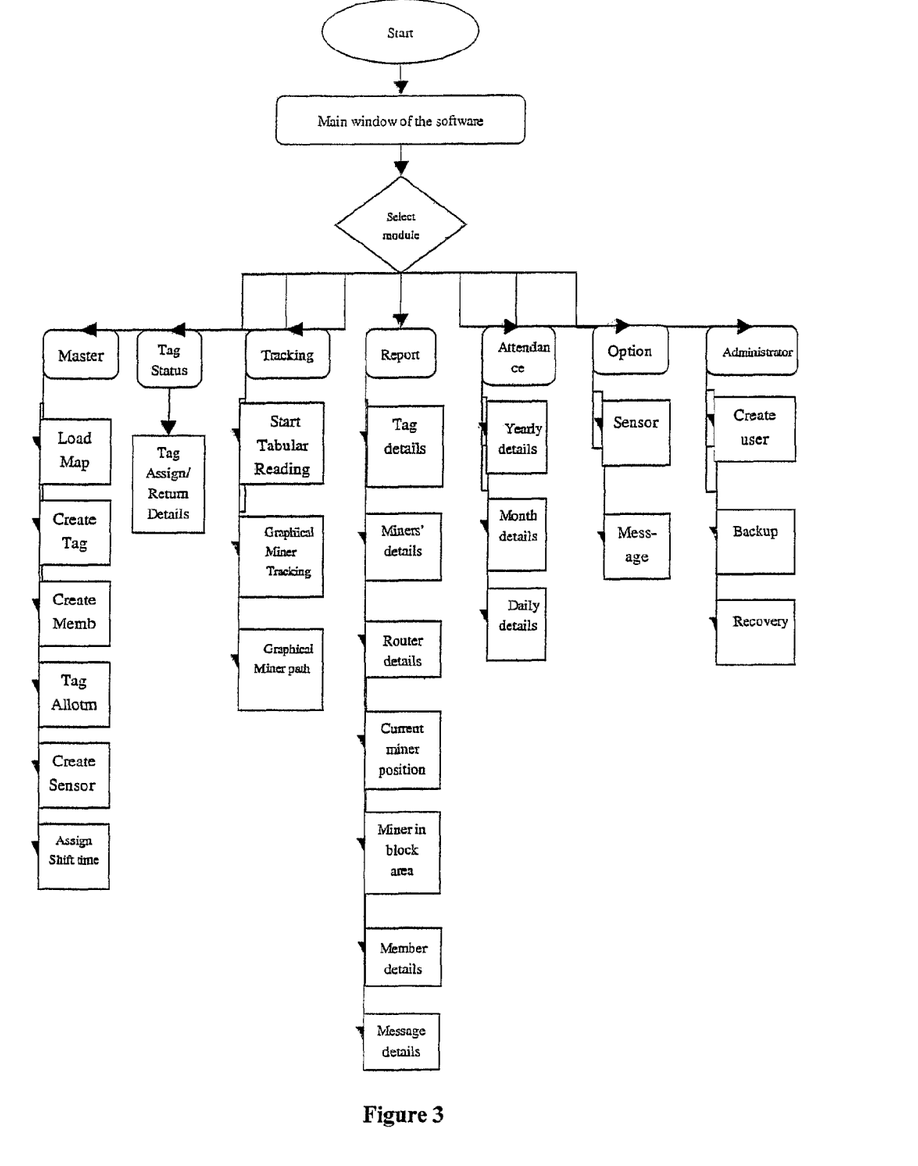

FIG. 3 of the drawings shows the flow diagram of application software, wireless sensor network (WSN). The WSN software is used for various purposes in mines and has following modules: (i) Tracking of miners and vehicles, (ii) Route tracking in opencast mines, (iii) Preventing fatal accidents, (iv) Preventing vehicle collisions, (v) Environmental monitoring, (vi) Monitoring miner's unsafe practice, (vii) Sending alert message, and (viii) Preparing computerised miners' duty hours.

Figure 4:
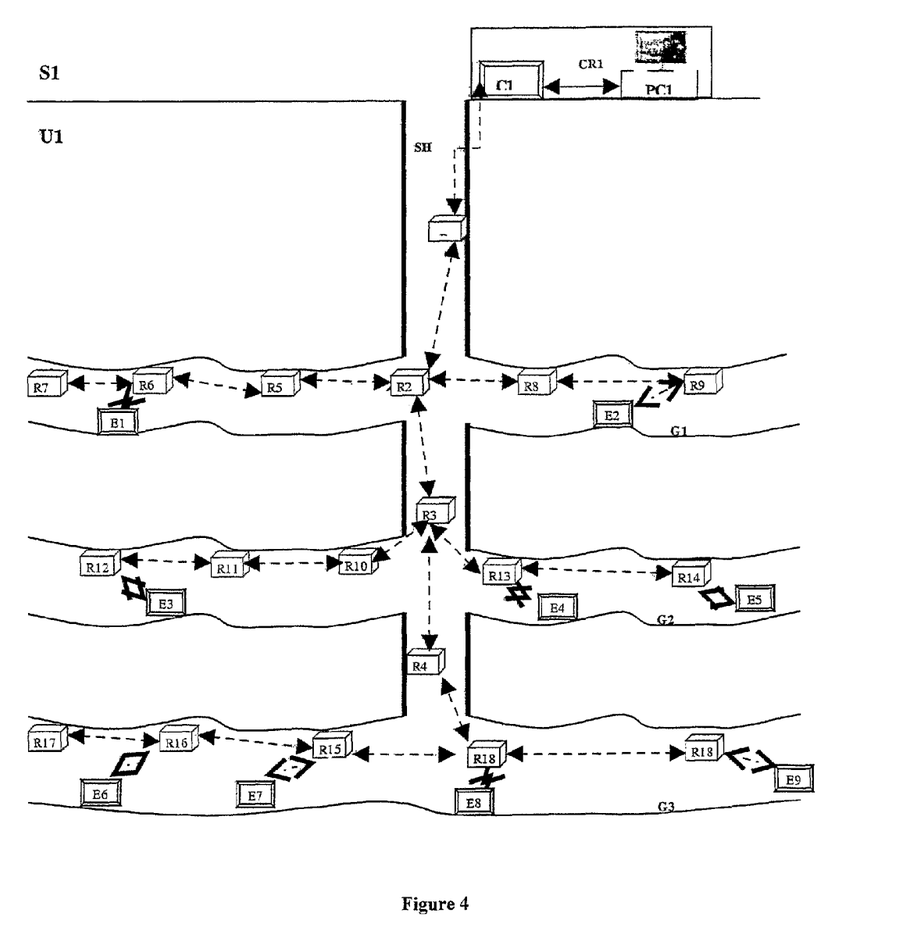
FIG. 4 of the drawings illustrates the wireless sensor network for an underground shaft mine.

FIG. 4 illustrates the wireless sensor network in an underground mine having shaft entrance. The sensor network consists of a personnel computer (PC1), coordinator (C1), router (R1 to R19) and end devices (E1 to E9). The computer (PC1) is connected to the coordinator (C1) using RS232 cable in the surface (S1) control room (CR1). The routers (R1 to R4) are wirelessly connected with the said coordinator (C1) at a distance of around 60 m apart in an underground (U1) shaft (SH). The routers (R5 to R7) and routers (R8 to R9) placed in the left and right sides of the first galley (G1), respectively at distance of around 50 m are wirelessly connected to the said router (R2). The end device (E1 and E2) attached with the miners/moveable equipment are wirelessly communicated with routers (R6 and R9), respectively. The routers (R10 to R12) and routers (R13 to R14) placed in the left and right sides of the second gallery (G2), respectively are wirelessly connected to the said router (R3). The end device (E3, E4 and E5) attached with the miners/moveable equipment are wirelessly communicated with routers (R12, R13 and R14), respectively. The routers (R15 to R17) and routers (R18 to R19) placed in the left and right sides of the third gallery (G3), respectively are wirelessly connected to the said router (R4). The end device (E6 to E9) attached with the miners/moveable equipment are wirelessly communicated with routers (R16, R15, R18 and R19), respectively.

Figure 5:
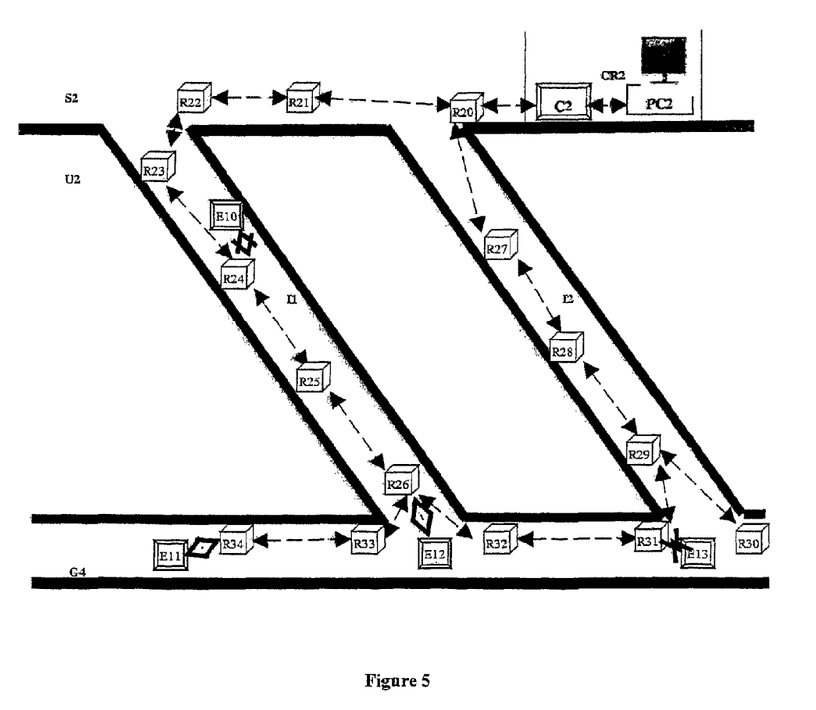
FIG. 5 of the drawings shows the wireless sensor network for an underground incline mine.

FIG. 5 shows the wireless sensor network in an underground mine having incline entrance. The wireless sensor network consists of a personnel computer (PC2), coordinator (C2), router (R20 to R34) and end devices (E10 to E13). The computer (PC2) is connected to the coordinator (C2) using RS232 cable in the surface (S2) control room (CR2). The routers (R20, R21 and R22) are wirelessly connected to the said coordinator (C2) at a distance of around 80 m apart in the surface (S). Routers (R23 to R26) placed in the intake incline (I1) at a distance of around 50 m are wirelessly connected to the said routers (R22). Routers (R27 to R29) placed in return incline (12) are wirelessly connected to the said routers (R20). Routers (R30 to R34) placed in the gallery (G4) at a distance of around 50 m are wirelessly connected to the said routers (R26 and R29). End devices (E10 to E13) fitted with miners/moveable equipment are wirelessly communicate with the said routers (R30, R34, R32 and R31), respectively.

Figure 6:
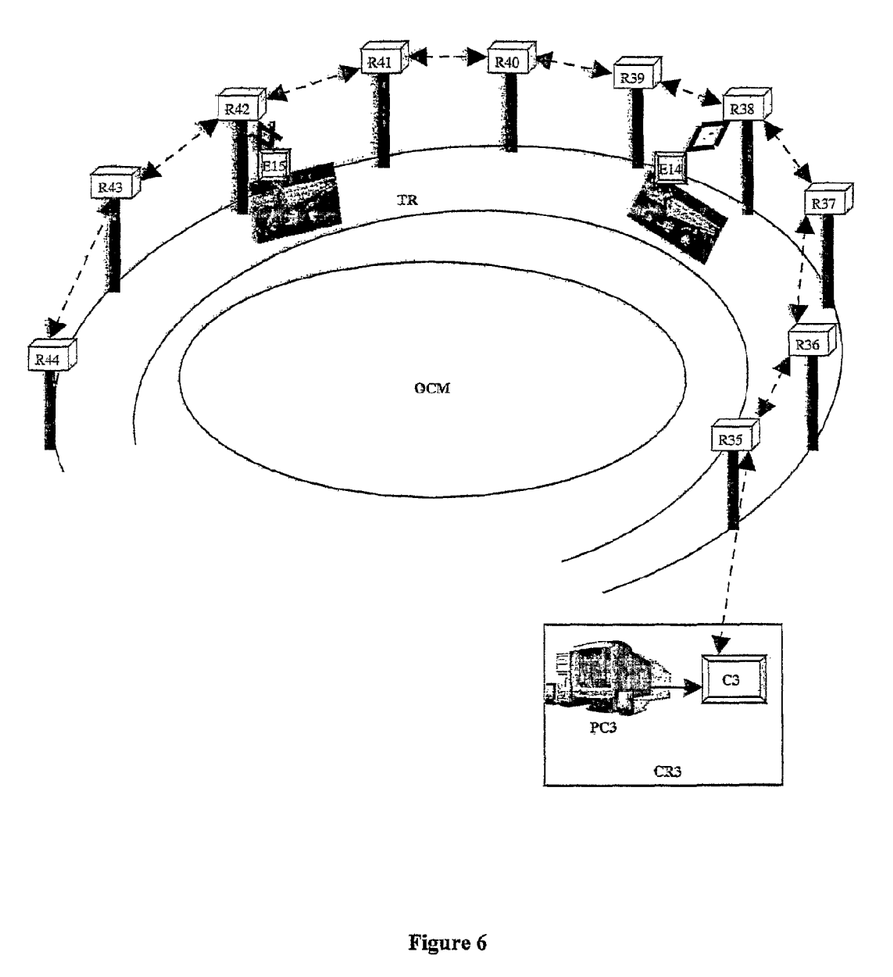
FIG. 6 of the drawings depicts the wireless sensor network for an opencast mine.

FIG. 6 shows the wireless sensor network in an opencast mine. The wireless sensor network consists of a personnel computer (PC3), coordinator (C3), router (R35 to R44) and end devices (E14 and E15). The computer (PC3) is connected to the coordinator (C3) using RS232 cable in the surface control room (CR3). The routers (R35 to R44) placed along the transport road (TR) of an opencast mine (OCM) at an interval of around 80 m distance are wirelessly connected with the said coordinator (C3). The end devices (E14 and E15) fitted with the dumpers (D1 and D2) are wirelessly communicated with the said routers (R38 and R42) routers, respectively.

Accordingly the present invention provides a wireless information and safety system for mines, characterized in that the said system comprises in combination a plurality of programmable active RFID transceiver devices, such as ZigBee-compliant devices programmable to operate as coordinators, routers and end devices, having resident hardware specific embedded software; the said plurality of programmed ZigBee-compliant RFID transceiver devices strategically placed to form an unified wireless mesh-networking infrastructure provided with resident wireless sensor network (WSN) application software for tracking, monitoring and storing of information received from said RFID devices connected to sensors.

In an embodiment of the present invention, the programmable active RFID transceiver (1 to 16) devices, such as ZigBee-compliant programmable devices to operate as coordinator, routers and end devices, having resident application specific embedded software, consists of a combination of antenna (1), low noise filter (2), down-conversion mixer (3), local oscillator (4), band pass filter (5), amplifier (6), analog to digital converter (7), digital demodulator (8), radio data interface (9), control logic (10), microcontroller unit (11), digital modulator (12), analog converter (13), low pass filter (14), up conversion mixer (15) and power amplifier (16); wherein the antenna (1) being connected in series to low noise filter (2), down-conversion mixer (3), band pass filter (5), amplifier (6), analog to digital converter (7) and digital demodulator (8); local oscillator (4) being connected to the said down-conversion mixer (3) and amplifier (6); the said digital demodulator (8) being connected to digital modulator (12) through radio data interface (9); control logic (10) being connected to the said digital demodulator (8), digital modulator (12) and the said radio data interface (9); microcontroller unit (11) being connected to the said data interface (9); the said digital modulator (12) being serially connected to analog converter (13), low pass filter (14), up-conversion mixer (15) and power amplifier (16); and the said local oscillator (4) being connected with the said up-conversion mixer (15).

In yet another embodiment of the present invention the RFID devices may be connected to sensors to enable environmental monitoring in the mine.

In another embodiment of the present invention, the ZigBee-compliant active RFID transceiver devices provided with resident hardware specific embedded software to act as coordinator, router and end device forms an IEEE 802.15.4-based mesh network for tracking of underground miners and equipment by wireless sensor networking in mines.

In still another embodiment of the present invention, the resident wireless sensor network (WSN) application software, such as herein described, is provided with the following modules: (i) Tracking of miners and vehicles; (ii) Route tracking in opencast mines; (iii) Preventing vehicle collisions and fatal accidents; (iv) Preventing vehicle collisions; (v) Environmental monitoring; (vi) Monitoring miner's unsafe practice; (vii) Sending alert message; and (viii) Preparing computerised miners' duty hours.

In yet another embodiment of the present invention, the resident hardware specific embedded software, such as herein described, for programming the RFID transceiver devices to function as coordinator, router and end devices, is compiled and debugged in an IAR Embedded Workbench and TI-make Library using language.

In still yet another embodiment of the present invention, the wireless information and safety system is capable of automatically forming alternative network among the undisturbed and reachable routers in case of disaster in particular area in underground mine so that communication does not get disturbed in the whole mine.

In a further embodiment of the present invention, the wireless information and safety system is a low-powered, intrinsically safe, easy to install and cost-effective system for underground and surface mines.

In a feature the present invention, the wireless information and safety system is capable of tracking and monitoring miners and moveable equipment in underground mine using ZigBee-enabled active RFID transceiver devices forming a wireless network among themselves and other static and mobile ZigBee devices placed at strategic locations.

In another feature of the present, invention the wireless information and safety system is capable of identifying the miners entering in underground mine to keep the track of the miners and maintaining computerized attendance.

In yet another feature of the present invention, the wireless information and safety system is capable of monitoring equipment locations and their operation to improve productivity and reduce fatal collision accident.

In still another feature of the present invention, the wireless information and safety system is capable of locating and tracking the miners in case of disaster for speedy rescue operation.

In a further feature of the present invention, the wireless information and safety system is capable of monitoring miners' unsafe practice and providing warning to the respective miner.

In a yet further feature of the present invention, the wireless information and safety system is capable of real-time monitoring environmental parameters in mines.

In another feature of the present invention, the wireless information and safety system is capable of sending coded message to the concerned person in underground mine.

In yet another feature of the present invention, the wireless information and safety system is capable of monitoring movement of dumpers in opencast mine, which ultimately helps in optimum shovel-dumper performance and improving productivity.

In the present invention there is provided a wireless information and safety system for mines, which comprises in combination of ZigBee-compliant devices, programmable to operate as end devices, routers and coordinators by hardware specific embedded software, and wireless sensor network (WSN) application software having various application modules both for underground and opencast mines. The core module, ZigBee-compliant devices (programmable to operate as end devices, routers and coordinator) consists of different sub-systems (1 to 16). The incoming 2.4 GHz RF signal is picked up by the antenna (1) and passes to the low noise filter (2) via duplexer. The said low noise filter (2) eliminates the DC offset and noise problem, and amplifies the RF signal from the antenna to a suitable level before feeding to the down-convertion mixer (3). At the said down-convertion mixer (3), the amplified signal is mixed with a high frequency signal generated by local oscillator (4). The output of the said down-convertion mixer (3) is then fed to the band pass filter (5). The signal thus obtained from the said down-convertion mixer (3) is down converted in quardrature to 2 MHz intermediate frequency (IF). The said down-convertion mixer (3) converts the received RF frequency to IF. The IF is filtered and amplified by the said band pass filter (5), which is auto-tuned by phase locked loop. The output of the said band pass filter (5) is fed to the amplifier (6), which controls over the gain by inbuilt automatic gain control (AGC). The automatic frequency control (AFC) of the said amplifier (6), controls the frequency of the said local oscillator (4), which is also inbuilt in the said amplifier (6). The AGC output is sampled with 4 MHz sampling rate at analog to digital converter (7) for further digitization. The digitized signal is fed to the digital demodulator (8), where channel filtering and demodulation are performed in digital domain. The signal thus obtained from the said digital demodulator (8) is an efficient digitized actual signal containing data, which is fed to the radio data interface (9) and control logic (10). The said radio data interface (9), interfaces the signal to the microcontroller unit (11). The said control logic (10) controls the signal of the said digital demodulator (8) and digital modulator (12). For transmission of the IF signal, coming from the said radio data interface (9) is modulated by the said digital modulator (12), and fed to the digital to analog converter (13) for the conversion of the digital signal. The output of the said digital to analog converter (13) is fed to the low pass filter (14), where the signal is filtered and again passes through the up-convertion mixer (15), which up converts the filtered signal directly to RF by a single sideband modulator with the help of the said local oscillator (4). The said up-convertion mixer (15) is designed for low-voltage operation and is ideal for use in portable consumer equipment. The said up-convertion mixer (15) operates with IF input frequencies between 40 MHz and 500 MHz, and up convert to output frequencies as high as 2.5 GHz. The output of the said up-convertion-mixer (15) is then fed to the power amplifier (16), which enhances the signal. The enhanced signal then passes to the said antenna (1) via duplexer. Duplexer combines two or more signals onto a common channel or medium to increase its transmission efficiency. It allows a transmitter to operate on one frequency and a receiver on a different frequency to share one common antenna with minimum interaction and degradation of the different RE signals. Then the RF signal transmits to the said antenna (1) for transmission. The ZigBee transceivers programmed to operate as coordinator (C) are connected with the computer (PC) by, serial port in the control room (CR) in the surface (S). The ZigBee transceivers which are programmed to work as routers (R) are placed along the roadway of interest at an interval of 50-80 m for forming wireless mess network and tracking miners and moveable equipment. The ZigBee transceivers which are programmed to function as end devices (E) are attached to the miners or moveable equipment. The said routers (R) receives signal form the said end devices (E) and forwarded to the coordinator (C) via multi-hop wireless network and same information is stored in the computer (PC). Similarly any message for the particular miner is also send in the reverse way. Different functions and storing information is done by the wireless sensor network (WSN) application software. The software has different application modules, namely, tracking of miners and vehicles, route tracking in opencast mines, preventing fatal accidents, preventing vehicle collisions, environmental monitoring, monitoring miner's unsafe practice, sending alert message and miners' duty hours reporting.

In a physical embodiment of the wireless information system for mines of the present invention the specification of the different units of the system are given below.

ZigBee transceivers as shown in FIG. 1: High performance low power 8051 Microcontroller core; Operating voltage is 2 V to 3.6 V; Operating ambient temperature range is $-40°$ C. to $85°$ C.; Frequency band is 2.4 GHz-2.4835 GHz ISM; Current consumption in receiving mode with active micro-controller is 27 mA and transmitting mode with active micro-controller is 25 mA; Radio bit rate is 250 kbps; Flash memory is 128 kb; and Receiver sensitivity is $-94$ dBm; Transition period from sleep to active mode is 54 µs; Transition period from active to receiving or transmitting mode is 450 µs.

The wireless sensor network (WSN) application software is developed in Visual Basic under windows environment as front end tool and SQL-Server as back end support. Visual Basic (VB) is an object oriented based software package, therefore various object provide by VB is used. Few functions and classes are designed in VB to integrate the software. For reporting very powerful and extensive software, Crystal Report is used.

The novel features of the wireless information and safety system for mines of the present invention have been realized by the non-obvious inventive steps of integrating ZigBee-compliant programmable transceivers to function as end devices, routers and coordinator by hardware specific embedded software and wireless sensor network (WSN) application software having various applications modules, namely tracking of miners and vehicles, route tracking in opencast mines, preventing fatal accidents, preventing vehicle collisions, environmental monitoring, monitoring miner's unsafe practice, sending alert message and miners' duty hours reporting. The ZigBee devices meet the IEEE 802.15.4 standard and have valuable features, which made the technology feasible and applicable in mines, namely, unlicensed 2.4 GHz ISM band, ultra low power consumption, operates for years on inexpensive batteries, allows large number of nodes/sensors, reliable and secure links between network nodes, easy deployment and configuration, low cost system, very fast transition time, digital battery monitor facility, smaller in size (system on chip), and capable of automatically forming alternative network among the routers in case of disaster.

The novelty of the present invention with respect to the prior art are:
1. Capable of tracking and monitoring miners and equipment in underground mine using ZigBee-enabled Active RFID transceiver devices forming a wireless network among themselves and other static and mobile ZigBee devices placed at strategic locations.
2. Capable of identifying the miners entering in underground mine to keep the track of the miners and maintaining computerized attendance.
3. Capable of monitoring equipment locations and their operation to improve productivity and reduce fatal collision accident.
4. Capable of locating and tracking the miners in case of disaster for speedy rescue operation.

5. Capable of monitoring miners' unsafe practice and providing warning to the respective miner.
6. Capable of real-time monitoring environmental parameters in underground mine.
7. Capable of sending coded message to the concerned person in underground mine.
8. Capable of automatically forming alternative network among the undisturbed and reachable routers in case of disaster in particular area in underground mine so that communication does not get disturb in the whole mine.
9. Capable of monitoring movement of dumpers in opencast mine, which ultimately helps in optimum shovel-dumper performance and improving productivity.
10. Enables a low-powered, intrinsically safe, easy to install and cost-effective miners' information and safety system for underground and surface mines.

The novelty of the wireless information and safety system for mines has been realized by the non-obvious inventive steps of providing in combination: ZigBee-compliant transceivers (programmable to function as end devices, routers and coordinator by hardware specific embedded software) and wireless sensor network (WSN) application software having various application modules both for underground and opencast mines. The system of the present invention mainly consists of two modules, ZigBee RFID transceivers which receive and transmit data by forming multi-hop wireless sensor network in required portion of the mines and a wireless sensor network (WSN) application software, which receives, process and stores data and send the necessary command/message to respective network devices.

The invention lies in the combination of hardware and software, wherein the hardware specific embedded software has been developed for programming the RFID transceiver devices function as coordinator, router and end devices. The embedded software is compiled and debugged in the IAR Embedded Workbench and TI-make Library using 'C' language. IAR Systems is a Swedish computer technology company working in the area of embedded system development tools, whereas TI (Texas Instrument) is an American company manufactures various electronics devices and chips. The application software, wireless sensor network (WSN), has been developed to track, monitor and store information received from RFID devices placed at strategic locations of a mine.

Use of the wireless information and safety system for mines of the present invention should be done as follows:

ZigBee RFID transceivers/devices (end devices, routers and coordinator) are housed in hard and tough structure to sustain tough mining conditions. The coordinator (C) is connected with the computer (PC) using RS232 cable in the surface control room. The routers (R) are hanged in the pole on the surface or hanged from the roof/side of shaft (SH)/incline (I)/gallery (G) so that it should not obstruct movement of man and machinery. The distance between two routers (R) may vary from 40-80 m in straight gallery (G)/road (TR)/shaft (SH)/incline (I) as the line-of-sight range is more. In case of small and labyrinth gallery (G) the distance between the routers (R) should be kept at lesser distance so that line-of-sight distance is maintained among the routers (R). The routers (R) should be placed in such a way that in case of disaster in a particular portion of mine, the communication can be established by alternative routes automatically. Following the above guidelines the routers (R) are placed on the strategic locations of the mine where monitoring and tracking of miners and moveable equipment are needed. These routers (R) form wireless mess network with the coordinator (C). The required environmental monitoring sensors are attached to the particular routers, where gas monitoring is essential. The end devices (E) are assigned to the miners and moveable equipment. The end devices (E) transmit signal/data to the respective routers (R) during their association with them. The respective routers (R) receives signal/data and transmit to the next routers (R) and subsequently data is transmitted to the coordinator (C) through the intermediate routers by multi-hop transmission mechanism. Finally coordinator (C) sends the data to the computer (PC). The same data is processed, analyzed and stored in the computer (PC) using wireless sensor network (WSN) application software. The software controls and commands all operations performed by the total network. The software performs various applications, namely, tracks miners and vehicles in underground mine, performs route tracking in opencast mines, prevents fatal accidents and vehicle collisions in underground mine, monitors underground environmental parameters, monitors miner's unsafe practice, sends alert message and reports miners' duty hours. The detail installation procedures for shaft underground mine, incline underground mine and opencast mine are depicted in FIGS. 4, 5 and 6, respectively.

The following examples are given by way of illustration of the wireless information and safety system for mines of the present invention in actual practice and therefore should not be construed to limit the scope of the present invention.

EXAMPLE—1

A prototype of the wireless information and safety system for mines of the present invention was used for experimentation in the laboratory under simulated condition. The experiment was conducted using 10 ZigBee-compliant RFID transceivers/devices. The RFID transceivers were programmed to operate as end devices (2 numbers), routers (7 numbers) and coordinator (1 number). The coordinator was connected with a computer using RS232 cable and one router was placed near the coordinator. Then remaining six routers were placed in two branches (corridors of the main office building), three routers in each branch keeping a distance of around 15 m between two routers. One of the routers was assigned as blocked device, which represented as an unsafe area. End devices were given to two persons and instructed to move in different directions of wireless network. The system was operated for four hours and the end devices movement were recorded in the computer using wireless sensor network software. The system provided warning signal when a person having end devices reached the particular router assigned as blocked area/unsafe area. The system provided tracking information of both the persons assigned with the end devices, their movement path, duration of stay in a particular area, current position, coded message to the respective end devices and total operation time.

EXAMPLE—2

Another experiment was performed with the prototype of the present invention in the Bagdiggi Mine of Bharat Coking Coal Limited. The experiment was conducted using ZigBee-enabled active RFID_transceiver devices (2 end devices, 7 routers and 1 coordinator) forming a wireless network among themselves and other static and mobile ZigBee RFID transceiver devices placed at strategic locations. The coordinator was connected with a laptop using RS232 cable near the shaft bottom where two galleries bifurcate from the entry point. One router was placed near the coordinator at a distance of around 20 m. Then remaining six routers were placed in two branches (galleries), three routers in each branch keeping a distance of around 40-50 m between two routers, so that line-of-sight is maintained between two routers. One router located in the last point of one branch (gallery) was assigned as blocked device, which was represented as an unsafe area. End devices were given to two persons and instructed to move in different directions of wireless network thus formed in the two galleries. The system was operated for eight hours and the end devices movement were recorded in the laptop using wireless sensor network software. The system provided warning signal when an end devices reached the particular router assigned as unsafe area. The system provided tracking information of both the persons assigned with the end devices, their movement path, duration of stay in a particular area, current position, coded message to the respective end devices and total operation time. The system was successfully experimented in the underground mine.

The wireless information and safety system for mines of the present invention essentially enabled to continuously track and monitor miners and moveable equipment in the mine. The system enabled to identify the miners entering in underground mine to keep the track of the miners and maintaining computerized attendance. The 'system enabled to monitor equipment locations and their operation to improve productivity and reduce fatal collision accident. The system enabled to monitor miners' unsafe practice and provide warning to the respective miner when approaching near to an unsafe area. The system enabled to monitor environmental parameters in underground mine. The system enabled to send coded message to the concerned person in underground mine.

Therefore, it is conclusively shown that the novel features enabled by the inventive steps of the detecting system for underground mine worker of the present invention essentially proved useful for the mine management for better safety.

The main advantages of the wireless information and safety system for mines of the present invention are:
1. The system tracks and monitor miners and equipment in underground mine using ZigBee-enabled active RFID transceiver devices forming a wireless network among themselves and other static and mobile ZigBee devices placed at strategic locations.
2. The system identifies the miners entering in underground mine to keep the track of the miners and maintains computerized attendance.
3. The system monitors equipment locations and their operation to improve productivity and reduce fatal collision accident.
4. The system locates and tracks the miners in case of disaster for speedy rescue operation.
5. The system monitors miners' unsafe practice and provides warning to the respective miner.
6. The system monitors environmental parameters in underground mine in real-time.
7. The system sends coded message to the concerned person in underground mine.
8. The system automatically forms alternative network among the undisturbed and reachable routers in case of disaster in particular area in underground mine so that communication of the whole mine does not get disturb in the whole mine.
9. The system monitors movement of dumpers in opencast mine, which ultimately helps in optimum shovel-dumper performance and improving productivity.
10. The system provides a low-powered, intrinsically safe, easy to install and cost-effective wireless information and safety mechanism for underground and surface mines.

We claim:
1. A wireless information and safety system for mines, characterized in that the system comprises in combination a plurality of programmable active RFID transceiver devices, programmable to operate as coordinators, routers and end devices, having resident hardware application-specific embedded software, and capable of forming a wireless network among themselves; wherein the plurality of programmed RFID transceiver devices are strategically placed to form a unified wireless mesh-networking infrastructure provided with resident wireless sensor network (WSN) application software for tracking, monitoring and storing of information received from the RFID devices connected to sensors;
   wherein the RFID transceiver devices form an IEEE 802.15.4-based mesh network for tracking of miners and equipment by wireless sensor networking in mines;
   wherein the RFID transceiver devices feature a 2.4 GHz industrial, scientific and medical (ISM) band; and further
   wherein the RFID transceiver devices consist of a combination of an antenna (1), a low-noise filter (2), a down-conversion mixer (3), a local oscillator (4), a band-pass filter (5), an amplifier (6), an analog-to-digital converter (7), a digital demodulator (8), a radio data interface (9), control logic (10), a microcontroller unit (11), a digital modulator (12), an analog converter (13), a low-pass filter (14), an up-conversion mixer (15) and a power amplifier (16); wherein the antenna (1) is connected in series to the low-noise filter (2), the down-conversion mixer (3), the band-pass filter (5), the amplifier (6), the analog-to-digital converter (7) and the digital demodulator (8); wherein the local oscillator (4) is connected to the down-conversion mixer (3) and the amplifier (6); wherein the digital demodulator (8) is connected to the digital modulator (12) through the radio data interface (9); wherein control logic (10) is connected to the digital demodulator (8), the digital modulator (12) and the radio data interface (9); wherein the microcontroller unit (11) is connected to the data interface (9); wherein the digital modulator (12) is serially connected to the analog converter (13), the low-pass filter (14), the up-conversion mixer (15) and the power amplifier (16); and wherein the local oscillator (4) is connected with the up-conversion mixer (15).

2. A wireless information and safety system for mines, as claimed in claim 1, wherein the programmable active RFID transceiver devices are ZigBee-compliant devices.

3. A wireless information and safety system for mines, as claimed in claim 1 or 2, wherein the resident wireless sensor network (WSN) application software enables: (i) Tracking of miners and vehicles; (ii) Route tracking in opencast mines; (iii) Preventing fatal accidents; (iv) Preventing vehicle collisions; (v) Environmental monitoring; (vi) Monitoring miners' unsafe practices; (vii) Sending alert messages; and (viii) Preparing computerised miners' duty hours.

4. A wireless information and safety system for mines, as claimed in claim 3, wherein the resident hardware application-specific embedded software for programming the RFID transceiver devices to function as coordinators, routers and end devices, is compiled and debugged in an IAR Embedded Workbench and TI-make Library using 'C' language.

5. A wireless information and safety system for mines, as claimed in claim 4, wherein the wireless information and safety system is capable of automatically forming alternative networks among the undisturbed and reachable routers in case of disaster in a particular area in an underground mine so that communication does not get disturbed in the whole mine.

6. A wireless information and safety system for mines, as claimed in claim 5, wherein the wireless information and safety system is a low-powered, intrinsically safe, easy-to-install and cost-effective system for underground and surface mines.

* * * * *